United States Patent [19]
Schnoll

[11] 4,240,679
[45] Dec. 23, 1980

[54] FREE OIL CONTROL IN A GYRO BEARING DESIGN

[75] Inventor: Howard S. Schnoll, Oakland, N.J.

[73] Assignee: The Singer Company, Little Falls, N.J.

[21] Appl. No.: 6,413

[22] Filed: Jan. 25, 1979

[51] Int. Cl.³ .................. F16C 33/66; F16C 33/38
[52] U.S. Cl. ................................. 308/187; 308/201
[58] Field of Search .............. 308/187, 199, 201, 217, 308/235

[56] References Cited

U.S. PATENT DOCUMENTS

| | | | |
|---|---|---|---|
| 2,838,348 | 6/1958 | Hamm | 308/201 |
| 3,645,592 | 2/1972 | Flandrena | 308/187 |
| 3,649,093 | 3/1972 | Muratore et al. | 308/201 |
| 3,753,605 | 8/1973 | Lehmann | 308/187 |
| 3,832,023 | 8/1974 | Fairbank | 308/201 |
| 3,994,544 | 11/1976 | Flatland | 308/201 |

FOREIGN PATENT DOCUMENTS

| | | | |
|---|---|---|---|
| 2656733 | 6/1977 | Fed. Rep. of Germany | 308/201 |
| 347477 | 8/1972 | U.S.S.R. | 308/217 |

*Primary Examiner*—Richard R. Stearns
*Attorney, Agent, or Firm*—T. W. Kennedy; L. A. Wright

[57] ABSTRACT

An antifriction bearing having a ball bearing retainer positioned between an outer race and an inner race. A plurality of slidable wedges of the bearing conforming to the dimensions of the raceways are mounted in slots in the periphery of the retainer. In operation a centrifugal force is exerted on the retainer urging the wedges of the retainer to ride in the raceways. The wedges thus act as wipers maintaining a smooth oil film for the ball bearings regardless of the amount of lubricant in the raceways.

5 Claims, 13 Drawing Figures

FREE OIL CONTROL IN A GYRO BEARING DESIGN

The Government has rights in this invention pursuant to Contract No. N00030-77-C-0102 awarded by the Department of the Navy.

This invention relates to ball bearings. More particularly, this invention relates to antifriction angular contact ball bearings which operate with minimum torque level change during its operation by means of controlling the free oil distribution in the ball bearing raceways.

BACKGROUND OF THE INVENTION

Generally ball bearings have been used in many applications to reduce the friction between moving surfaces. However in certain applications such as gyroscopes where a spinning rotor determines the accuracy of the instrument, the requirement for minimum torque level change is extremely important because errors may be introduced into the instrument thereby compromising its accuracy and utility. Present day techniques for insuring low friction rely on brute force or cut and try methods. These methods include extensive cleaning and parts preparation and if after buildup testing is out of specifications, then rebuilding and repeating the assembly process in whole or in part is required until the specifications are met. These old methods lead to excessive costs and cycle time to complete buildup and are prime disadvantages of present day techniques.

BRIEF DESCRIPTION OF THE INVENTION

The present invention employs a unique bearing retainer which is "raceway riding" in lieu of the prior art of land riding inner or outer and less frequently used ball riding. The invention comprises a bearing device having an outer race, an inner race, a retainer having ball pockets for a complement of balls and a plurality of slidable wedges or elongated flat members having a portion conforming to the shape of the outer race which are mounted in slots which are in the periphery of the retainer or separator. In operation, outer race land fixed and inner race rotating or vice versa outer race rotating and inner race fixed will impart rotation motion to retainer and upon reaching a high enough speed the wedges under centrifugal force will contact the outer race maintaining a smooth oil film, for the bearing surfaces.

Accordingly, it is an object of this invention to provide a ball bearing device which controls the oil distribution in a high speed antifriction bearing.

This object and other features of the invention will become apparent to those skilled in the art taken in conjunction with the following description and the accompanying drawings wherein.

Figure 1:
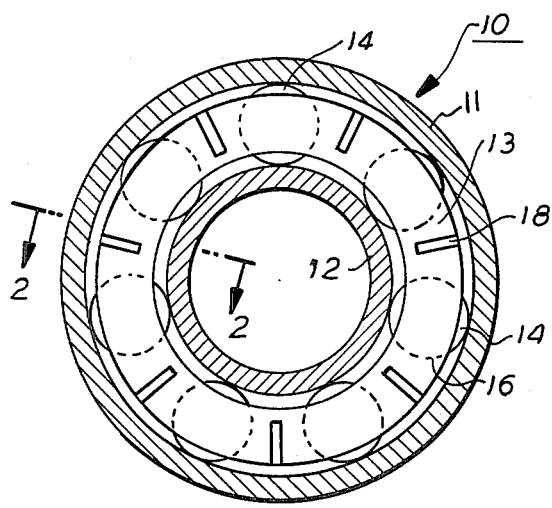
FIG. 1 is a cross sectional view of a ball bearing assembly in accordance with the invention.
Figure 13:
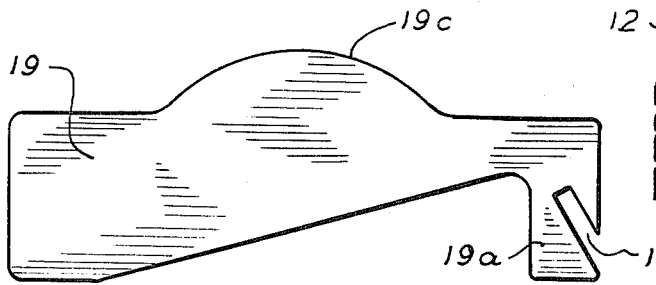
FIG. 13 is an exploded plan view of the wedge.

Referring to FIG. 1, the bearing system according to the invention is shown generally at 10. It includes a metallic circular outer race 11, a metallic circular inner race 12, a circular retainer or separator 13 positioned between the outer race 11 and inner race 12. The retainer 13 which may be made of a phenolic plastic material contains a plurality of steel bearing balls 14 which rollably engage the raceways of the inner and outer races. The balls 14 are contained within ball pockets 16 of retainer 13. A plurality of slots 18, are formed in the periphery of retainer 13. It is to be understood that although FIG. 1 shows seven balls and seven slots, the bearing will achieve its low friction objective with either a greater or lesser amount of balls and slots. Moreover, it is not required that the number of slots and balls be equal. A wedge or elongated flat member having a portion conforming to the shape of the outer race 19 which may be formed of nylon or other plastic material, as shown in FIG. 13, is inserted in the slots 18.

Figure 2:
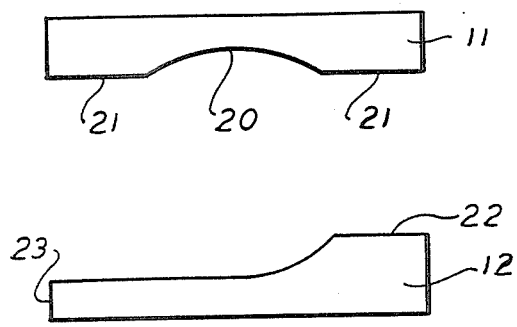
FIG. 2 is a simplified sectional view taken along the line 2—2 of FIG. 1 showing only the inner race and outer race.
Figure 6:
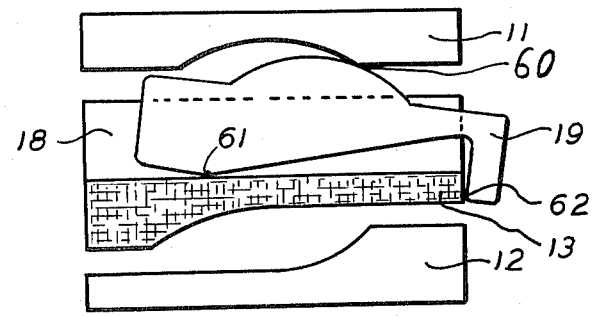
FIG. 6 is a view similar to FIG. 5 showing the wedge at interference points of the bearing.
Figure 3:
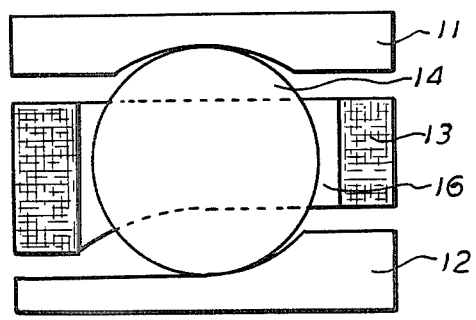
FIG. 3 is a view similar to FIG. 2 showing in addition an angular contact ball and its retainer.
Figure 7:
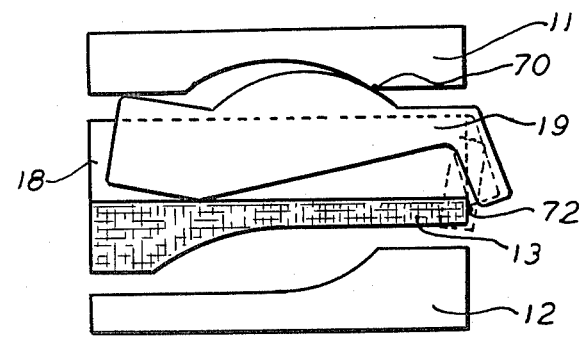
FIG. 7 is a view similar to FIG. 6 showing the wedge in the bearing assembly and the flexing of the wedge.
Figure 4:
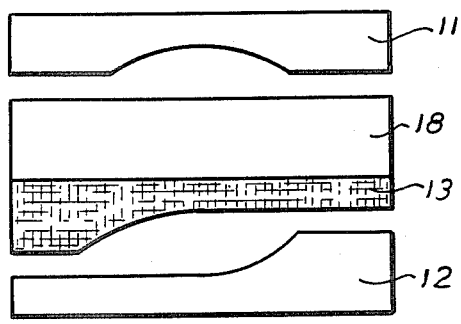
FIG. 4 is a view similar to FIG. 2 showing in addition the slot area of the retainer at a half-way point location between ball pockets.
Figure 8:
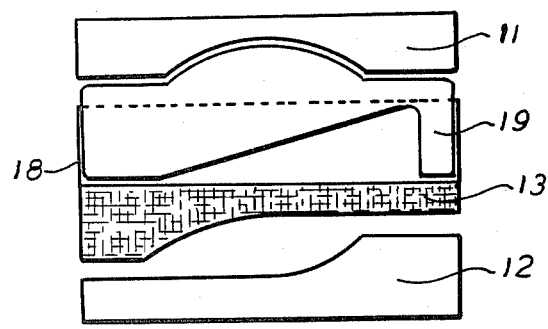
FIG. 8 is a view similar to FIG. 7 showing final location of the wedge in the bearing assembly.
Figure 5:
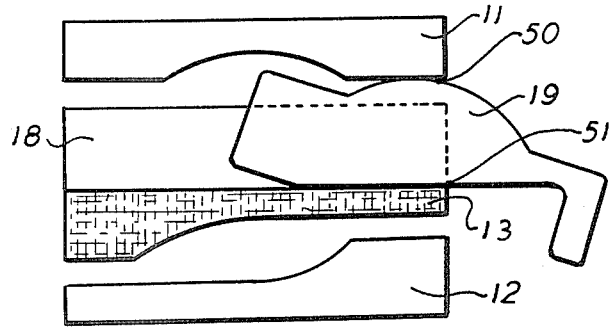
FIG. 5 is a view similar to FIG. 4 showing the start of the assembly of the wedge into the slot of the retainer.

Turning to FIGS. 2–9 we see in a sectional view taken along the line 2—2 of FIG. 1 the elements of the bearing system. In FIG. 2 outer bearing 11 comprises a deeped groved raceway 20 defined by uninterrupted shoulders 21 also referred to in the art as lands. Inner race 12 comprises a single shoulder or land 22. FIG. 3 shows the bearing assembly with outer race 11, ball 14, retainer 13 and inner race 12. The plurality of balls 14 comprise an angular contact bearing with retainer 13 at ball pocket 16. In FIG. 4 the retainer 13 is positioned at a halfway point between the ball pockets. The location for the insertion of wedge 19 is shown at slot 18. In FIG. 5, wedge 19 is smoothly inserted at interference points 50 and 51 in slot 18 of retainer 13. FIG. 6 shows further insertion of wedge 19 in slot 18 at interference points 60, 61 and 62. FIG. 7 shows the insertion of wedge 19 into slot 18, noting that the reduced cross section area of wedge 19 allows flexing at interference point 72. The other interference points are shown as 70 and 71. FIG. 8 shows wedge 19 fully inserted in slot 18 of retainer 13.

Figure 9:
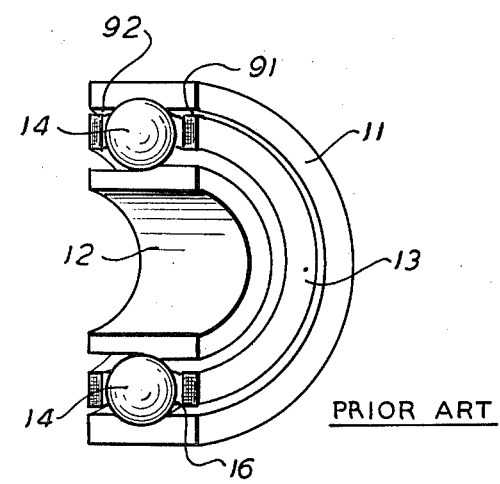
FIG. 9 is a prior art, outside diameter riding retainer perspective view in partial section of the bearing assembly showing the retainer riding on the lands of the outer race.
Figure 10:
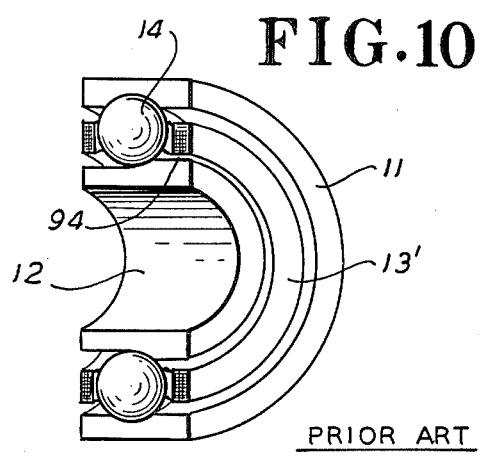
FIG. 10 is a prior art inside diameter riding retainer view similar to FIG. 9 showing the retainer riding on the lands of the inner race.

FIG. 9 is a perspective sectional view of a prior art bearing assembly showing an outside diameter lands riding retainer. It is seen that the radial clearance between the retainer 13' and outer race 11 is narrower than the radial clearance between retainer 13 and the inner race 12. In FIG. 9, retainer 13' is shown operating at full speed and it runs eccentrically in the raceway of outer race 11 slidingly contacting outer race 11 at land areas 91 and 92. It is to be understood that bearing elements, outer race 11 or inner race 12 may rotate in operation while the other bearing element remains stationary. In either case, the rotating dynamics will cause the retainer 13' to run eccentrically at 91 and 92. FIG. 10 is a prior art bearing assembly showing the condition when the radial distance between inner race 12 and retainer 13' is narrower than the radial clearance between retainer 13 and outer race 11. In FIG. 10 retainer 13 is shown contacting the land surface 94 of inner race 12, thereby illustrating the case of the inside diameter land riding retainer.

Figure 11:
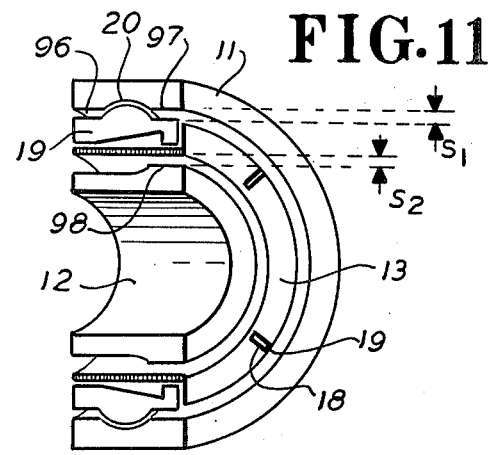
FIG. 11 shows the retainer of the invention slotted alternately between ball pockets adapted to receive the wedges.

FIG. 11 is a view of the bearing assembly of the invention showing the condition where the inner and outer diameter tolerances between the retainer and the inner and outer races are relieved by the relatively large radial clearances at $S_1$ and $S_2$. It is also seen in FIG. 11 that the retainer 13 comprises alternate slots 18 between ball pockets containing wedges 19. Since wedges 19 are slidably inserted in slot 18, there is a loose radial fit up all around the outer raceway at 20. The fit up is dimensioned so as not to prevent either the lands 96, 97 and land 98 of outer race 11 and inner race 12 respectively, from contacting retainer 13 during its operation, thereby illustrating that the bearing assembly of the invention is an outer raceway riding retainer. This feature of the invention is totally new in the art.

Figure 12:
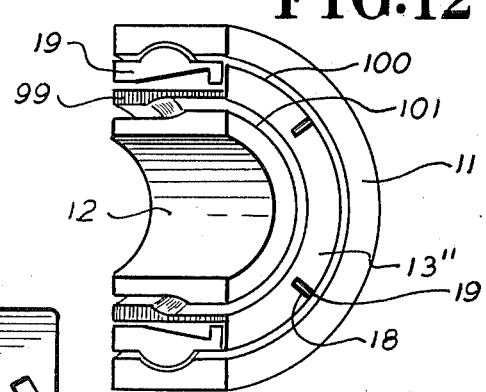
FIG. 12 is a view similar to FIG. 11 showing the retainer reinforced in order to strengthen the retainer at the slotted areas.

FIG. 12 is a view similar to FIG. 11 showing the retainer 13" stiffened or reinforced along its inner periphery at 99 to strengthen the slot 18. This is provided to strengthen the retainer in the area of the slots. Lubrication may be added onto balls 14 (not shown) at either 100 or 101.

From FIG. 13 the general configuration of wedge 19 is seen in detail. Wedge 19 has a generally rectangular shape with a generally triangular piece cut out along the bottom length to define a hook shaped portion 19a. A slot 19b is cut in the nose of the hook portion 19a to facilitate removal from the bearing assembly. At the top of wedge 19 and midway thereof there is a hump 19c which conforms to the grooved raceway 20 of outer race 11 and which spreads the oil in the raceway evenly in order to minimize torque variations during operation. Wedge 19 may be made of a spring metal or formed of plastic material such as nylon.

In operation, wedges 19 being separable from retainer 13 move radially outward under centrifugal force, self align, and ride individually in grooved raceway (FIG. 2) of the outer race 11. As a result, absolute running torque comparison to the prior art retainer design of FIGS. 9 and 10 reveals no detrimental increase in the bearing's mechanical losses. Larger radial clearances between the retainer and the inner and outer races are permitted with the wedge retainer design of the invention than with the prior art design of FIG. 9 or FIG. 10. This permits looser controls on parts tolerances. Although large radial clearances may have a tendency to cause instability giving rise to higher torque variations during operation, the wedge retainer design of the present invention dampens out the retainer instability mode as shown in vibration environmental testing.

From a practical standpoint, wedge 19 will continuously act as a scavenger to maintain the bearing surfaces clean from foreign debris (commonly referred to in the art as contamination) that enters from exterior sources or which may arise from extended run-in of bearings or retainer/lubrication degradation, therefore extending the life of the bearing.

As previously mentioned, the method of initial assembly provides that the maximum of cleanliness conditions will be met with the present invention over the prior art at the beginning of the run-in period. This is a common technique that has been used by low cost bearing application users for years, but because of the accuracy needed in gyroscope-type bearing lubrication, has been avoided. It is now possible to over lubricate as shown in FIG. 12 and self adjustment of the lubrication results with the wedge design of the present invention.

From the foregoing description an antifriction angular contact ball bearing useful in a gyroscope but not limited thereto to has been described. It is understood that the description herein relates only to a preferred embodiment of the invention and that it is intended to cover all changes and modifications of the example of the invention herein chosen for purposes of the disclosure which do not constitute departures from the spirit and scope of the invention.

I claim:

1. An antifriction angular contact ball bearing comprising:
    an outer race,
    an inner race,
    an integral retainer positioned between said outer and inner races having a plurality of spaced ball pockets,
    a plurality of balls disposed within said retainer ball pockets, and
    a plurality of elongated flat members having a portion conforming to the shape of the outer race slidably disposed in slots opening on the periphery of said retainer and contacting said outer race by means of centrifugal force whereby lubricant between said outer races and said retainer is maintained at a level to provide a consistently low friction bearing.

2. The antifriction angular contact bearing of claim 1 comprising:
    a plurality of slots alternately spaced between said ball pockets in which said elongated flat members are slidably disposed, and
    means on said retainer for strengthening said retainer at said slots.

3. The antifriction angular contact bearing of claim 2 comprising:
    a retainer and elongated flat members made of a plastic material.

4. An antifriction angular contact ball bearing comprising:
    an outer race having a deep groove raceway with uninterrupted shoulders,
    an inner race having a second raceway with a single shoulder adjacent one side of said second raceway and an unshouldered side opposite said single shoulder said unshouldered side having a cylindrical surface continuous with said second raceway,
    a retainer positioned between said outer and inner races having a plurality of spaced ball pockets,
    a plurality of balls disposed within said ball pockets rollably engaging said raceways,
    a plurality of spaced slots alternately positioned between said ball pockets in the periphery of said retainer, and
    a plurality of elongated flat members slidably disposed in said slots in said retainer and movable under centrifugal force into said raceways whereby lubricant in said raceways is maintained at a level to provide a consistently low friction bearing between the surfaces of said outer and inner races and said retainer.

5. The antifriction angular contact bearing of claim 4 comprising:
    means on said retainer for strengthening said retainer at said slots.

* * * * *